United States Patent [19]
Heidel et al.

[11] Patent Number: 5,212,707
[45] Date of Patent: May 18, 1993

[54] ARRAY OF DIFFRACTION LIMITED LASERS AND METHOD OF ALIGNING SAME

[75] Inventors: Jeffrey Heidel, Red Bud, Ill.; Mark Zediker; Keith Throgmorton, both of Florissant, Mo.; William Harting, Churubusco, Ind.

[73] Assignee: McDonnell Douglas Corporation, St. Louis, Mo.

[21] Appl. No.: 802,838

[22] Filed: Dec. 6, 1991

[51] Int. Cl.⁵ .................... H01S 3/19; G02B 5/18
[52] U.S. Cl. ............................ 372/50; 372/43;
372/36; 372/101; 372/102; 372/108; 359/569;
359/572; 359/652; 359/653; 359/900
[58] Field of Search .............. 372/43, 44, 46, 47,
372/50, 70, 92, 101, 102, 108, 38, 36; 359/642,
652, 653, 900, 572, 569

[56] References Cited

U.S. PATENT DOCUMENTS

| | | | |
|---|---|---|---|
| 4,813,762 | 3/1989 | Leger et al. | 372/44 |
| 4,846,552 | 7/1989 | Veldkamp et al. | 359/572 |
| 4,847,522 | 7/1989 | Fuller et al. | 307/473 |
| 5,033,060 | 7/1991 | Leger et al. | 372/97 |
| 5,070,509 | 12/1991 | Meyers | 372/45 |
| 5,101,454 | 3/1992 | Blonder et al. | 372/50 |
| 5,159,604 | 10/1992 | Mehuys et al. | 372/50 |
| 5,164,955 | 11/1992 | Meyers | 372/50 |

Primary Examiner—Brian Healy
Attorney, Agent, or Firm—Guy R. Gosnell; Benjamin Hudson, Jr.; Timothy H. Courson

[57] ABSTRACT

A one-dimensional semiconductor laser array assembly typically comprising a one-dimensional semiconductor laser array, a heatsink upon which the laser array is bonded, and a lens assembly. The one-dimensional semiconductor laser array consists of a plurality of emitters with each emitter electrically connected in parallel to a power supply. The bonding agent, typically silver epoxy, must be of a uniform thickness so that the laser array is aligned properly upon the heatsink. The lens assembly is typically comprised of a refractive lens, typically of a bi-convex design, and a one-dimensional array of binary optical elements. The one-dimensional array of binary optical elements is designed such that each element has a front surface having a binary optic diffractive element etched thereon. The refractive lens and the one-dimensional array of binary optical elements are aligned and held in place by means of ears protruding from the heatsink. There is also provided by this invention a two-dimensional semiconductor laser array assembly consisting of a plurality of one-dimensional semiconductor laser array assemblies positioned substantially parallel to one another, within a clamping fixture, with the lens assembly of each one-dimensional laser array assembly positioned such that the output of each one-dimensional laser array is focused to the same point in the far field to provide a high intensity output and method for so aligning the two-dimensional laser array assembly. A lens assembly is also provided for focusing the output at a variable point.

21 Claims, 3 Drawing Sheets

ARRAY OF DIFFRACTION LIMITED LASERS AND METHOD OF ALIGNING SAME

BACKGROUND OF THE INVENTION

This invention relates generally to high power semiconductor laser arrays and more particularly to high power semiconductors laser arrays mounted and collimated in such a way that a single spot of high intensity light is produced.

In numerous applications such as laser tracking, laser guidance and laser imaging, it is desirable to produce a high power coherent laser output. In the past, single semiconductor lasers were utilized to provide a coherent source of laser output. Such single semiconductor lasers were limited in the amount of power which they could provide due to their structural limitations and limited efficiency. Arrays of semiconductor lasers have also been utilized where adjacent emitters of the array of semiconductor lasers spaced upon the same substrate would be coupled together such that a known angular displacement would exist between the output of the adjacent emitters. In this fashion, a coherent laser output beam of a slightly higher power could be provided.

Typically, such arrays of semiconductor lasers suffered from several deficiencies. One such deficiency was the necessity for a bulky power supply or a specially designed power supply from which to power the array of semiconductor lasers. This bulkier, specially designed power supply decreases the mobility of the semiconductor laser array as well as increasing the expense of fabrication. An additional deficiency was the inability to precisely collimate and focus the output of the laser array such that the adjacent beams could be overlapped to create a very high light intensity.

Additionally, many other semiconductor laser arrays utilize multimode laser devices which were unable to form a tight single spot of laser light but instead produced a larger, less intense laser output. Another deficiency with typical semiconductor laser arrays is the inconsistent thickness of the bond formed between the laser array and the mounting structure or heat sink. This inconsistency, typically caused by irregularities in the bonding material utilized, cause the output of the laser array to be misaligned and not form a single spot of high intensity laser output.

It would be desirable for a semiconductor laser array to produce a single spot of high intensity laser output from a small power supply that is not bulky or does not require a special design. Furthermore, it would be desirable for a semiconductor laser array to be mounted evenly and collimated such that the laser output's fill the aperture available to provide a substantially constant intensity across the single spot of laser output produced.

SUMMARY OF THE INVENTION

Figure 1:
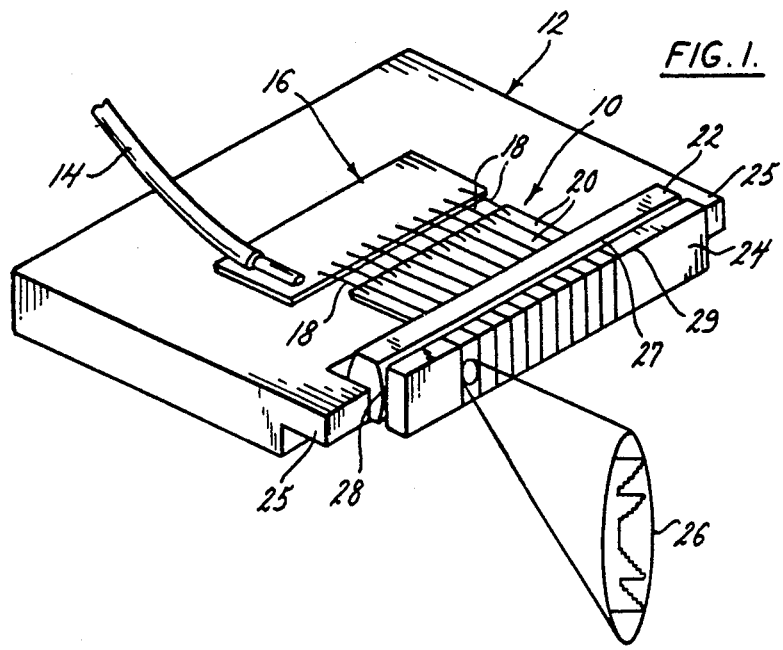
FIG. 1 is a perspective view of a one-dimensional semiconductor laser array assembly, a refractive lens, and a binary optic element incorporating the principles of this invention.

There is provided by this invention a one-dimensional semiconductor laser array assembly. The one-dimensional laser array assembly typically comprises a one-dimensional semiconductor laser array, a heatsink, typically comprised of beryllium oxide (BeO) or Elkonite (Cu-W), upon which the laser array is bonded, and a lens assembly. The one-dimensional semiconductor laser array consists of a plurality of emitters with each emitter electrically connected in parallel to a power supply. The bonding agent must be of a uniform thickness so that the laser array is aligned properly upon the heatsink. A typical bonding agent is silver epoxy. The lens assembly is typically comprised of a refractive lens and a one-dimensional array of binary optical elements. The refractive lens collimates the fast axis of the output of each emitter and is typically of a bi-convex design. The refractive lens may be a rod lens such that the single rod may collimate the fast axis of each emitter of a one-dimensional semiconductor laser array. The one-dimensional array of binary optical elements is designed such that each element has a front surface having a binary optic diffractive element etched thereon to collimate the slow axis of the output of each emitter and to correct for spherical aberrations including those introduced by the refractive lens. The binary optic diffractive element is typically a two-phase level structure, a four-phase level structure, an eight-phase level structure or a sixteen-phase level structure. The refractive lens and the one-dimensional array of binary optical elements are aligned and held in place by means of ears protruding from the heatsink so as to properly collimate and aberration correct the semiconductor laser array's output.

There is also provided by this inention a two-dimensional semiconductor laser array assembly typically consisting of a plurality of one-dimensional semiconductor laser array assemblies positioned substantially parallel to one another with the lens assembly of each one-dimensional laser array assembly positioned such that the output of each one-dimensional laser array is focused to the same point in the far field to provide a high intensity output. The plurality of one-dimensional semiconductor laser array assemblies are held in place in a clamping fixture which retains the assemblies in their appropriate position.

The refractive lens and the one-dimensional array of binary optic elements, which are secured to one another, are positioned, in forming the two-dimensional semiconductor laser array assembly, such that the outputs of each one-dimensional semiconductor laser array are focused on the same spot in the far field. This positioning is done by means of a repetitive procedure in which following the placement and retention of the first lens assembly each subsequent lens assembly is held in position by means of a vacuum chuck attached to a vacuum line. The two-dimensional semiconductor laser array is then powered and the output of the one-dimensional semiconductor laser arrays having lens assemblies to collimate and aberration correct their output are monitored in the far field by means of a transform lens placed in their path which simulates the far field effect at its focal point. A line scan detector is placed at the focal point at the transform lens such that by varying the position of the lens assembly, currently held by the vacuum chuck, until a maximum reading is obtained on the line scan detector, the lens assembly may be positioned. When this maximum power level is obtained on the line detector, the lens assembly is retained in its current position by means of a bonding material placed between the ears of the heatsink and the lens assembly. This positioning procedure is repeated for each one-dimensional semiconductor laser array assembly of the two-dimensional semiconductor laser array assembly so that a maximum power level may be delivered to a common point in the far field.

A lens assembly for providing a variable focol length for the collimated output of the laser array is also provided. The lens assembly is coprised of a pair of identical plano convex lenses. A former pair of fixed lenses may be introduced between the plano convex lenses in order to prevent the focusing of the light to a single spot within the lens assembly.

DETAILED DESCRIPTION OF THE PREFERRED EMBODIMENT

Referring to FIG. 1, there is shown a one-dimensional semiconductor laser array 10 mounted on a heatsink 12 having a lens assembly for collimating the laser array's output positioned adjacent to the emitting facet of the semiconductor laser array. Typically, the lens assembly is attached to the ears 25 of the heatsink 12 which extend forward and to the side of the emitting facet of the semiconductor laser 10. The emitters 20 of the semiconductor laser array 10 are supplied power by means of a single power lead 14 connecting an external power supply with a standoff pad 16 positioned on the heatsink 12. Individual wires 18 connect a standoff pad 16 with the emitters 20 of the semiconductor laser array 10. In this fashion each emitter 20 of the semiconductor laser array 10 is supplied power in parallel with each of the other emitters of the semiconductor laser array such that each emitter 20 gets a equal power level. Only a single power lead 14 is required to connected a standoff pad 16 with the external power supply as the heatsink 12 to which the semiconductor laser array 10 is attached serves as the ground for the circuit.

While the semiconductor laser array 10, shown in FIG. 1, is comprised of ten individual emitters 20, the number of emitters 20 present in a semiconductor laser array 10 may be any number as determined by the requirements of the particular application. Additionally, the number of leads 18 between the standoff pad 16 and the semiconductor laser array 10 is shown to be equal to the number of emitters 20 of the semiconductor laser array 10 such that each emitter 20 of the array 10 is fed separately, however, any number of leads 18 may be utilized, since all emitters are connected in parallel. Furthermore, the lead 14 from the power supply may directly contact the emitters 20 of the laser array 10 to obviate the stand off pad 16. Additionally, while a single, one-dimensional laser array 10 as shown in FIG. 1 and hereinafter discussed the invention may also be applied to two-dimensional laser arrays as will be described in more detail later.

Figure 2:
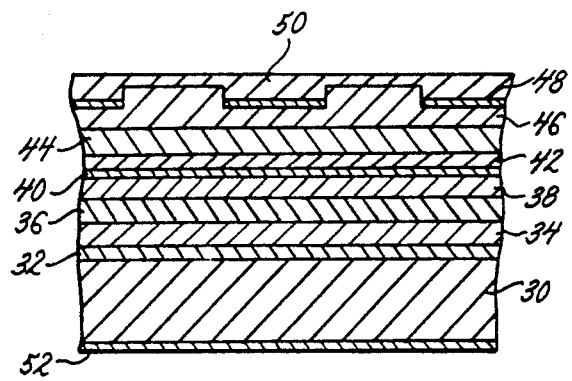
FIG. 2 is a cross-sectional view of a one-dimensional semiconductor laser array.

While the semiconductor laser array 10 may be comprised of any of a variety of materials as known to those skilled in the art and the physical dimensions of a semiconductor laser construction may also be varied as known to those skilled in the art, a GaAs semiconductor laser device will be described in more detail as an example. The semiconductor laser array 10 should be operable in a single mode, however, so that the output beams may be focused to a single spot. A pair of adjacent emitters for a GaAs semiconductor laser 10 is shown in FIG. 2. This GaAs semiconductor laser 10 is fabricated upon an N-doped GaAs substrate 30 upon which an N-doped GaAs buffered 32 layer is deposited. Upon the GaAs buffer layer 32 is deposited an N-doped $Al_{0.15}Ga_{0.85}As$ buffer layer 34 and an N-doped $Al_{0.6}Ga_{0.4}As$ cladding layer 36. On the $Al_{0.6}Ga_{0.4}As$ cladding layer 36 is deposited the GRIN-SCH structure consisting of an $Al_xGa_{1-x}As$ graded index structure 38 upon which GaAs quantum well 40 is deposited followed by a second graded index structure 42 comprised of $Al_xGa_{1-x}As$. In this GRIN-SCH structure, the graded index layer 38 adjacent to the N-doped cladding layer 36 has an aluminum fraction which varies from 0.6 at the interface of the graded index layer 38 and the cladding layer 36 to 0.3 at the interface of the graded index layer 38 and the quantum well 40. Likewise, the second graded index layer 42 has an aluminum fraction which varies from 0.3 at its interface with the GaAs quantum well 40 to 0.6 at the interface opposite the GaAs quantum well 40. Upon the $Al_xGa_{1-x}As$ graded index layer 42, an $Al_{0.6}Ga_{0.4}As$ cladding layer 44 is deposited. The semiconductor laser structure is completed by depositing a P-doped $Al_{0.6}Ga_{0.4}As$ cladding layer 46 upon the $Al_{0.6}Ga_{0.4}As$ cladding layer 44.

Once the basic semiconductor layered structure has been produced, the ribs are then fabricated by conventional technology. Generally, a layer of silicon dioxide is deposited on the $Al_{0.6}Ga_{0.4}As$ cladding layer 46. Covering the silicon dioxide layer is a layer of photoresist upon which a photomask is placed. The photomask is designed to cover the portions of the wafer under which the ribs are desired to be located. The photoresist is subsequently exposed and developed and the mask is then removed to allow the silicon dioxide to be etched from the wafer surface in all areas not covered by photoresist. The photoresist is subsequently removed leaving an upraised rib of silicon dioxide on the surface of the semiconductor material. Chemically assisted ion beam etching is next utilized using $ArCl_2$ to define the actual ribs. The chemically assisted ion beam etching removes the portions of the P-doped $Al_{0.6}Ga_{0.4}As$ cladding layer 46 which do not lie under an area in which the silicon dioxide is now covering. Once a sufficient amount of the cladding material 46 has been removed, the chemically assisted ion beam etching is ended and a reactive ion etch is utilized to remove the oxide mask from what now constitutes the rib. Once the rib pattern has been formed on the semiconductor wafer, a layer of silicon dioxide 48 is deposited over the wafer surface followed by a deposit of photoresist which is sufficient to substantially planarize the wafer. By planarizing, the ribbed surface of the semiconductor wafer becomes the substantially planar as more photoresist fills in the portions between the rib locations than the amount of photoresist which overlies the ribbed areas. The photoresist and silicon dioxide 48 is etched until openings along the mesa portions of the ribs are exposed. Subsequently, the photoresist is removed leaving the silicon dioxide 48 to cover the portions of wafer between the mesas of the ribs. A P-side contact layer 50 is then deposited on the ribbed surface of the semiconductor structure. This P-side contact layer 50 is typically comprised of a metal such as gold and may cover the entire surface of the semiconductor wafer with contact only made in those mesas areas of the ribbed wave guides as the other portions of the semiconductor wafer covered by a silicon dioxide insulation layer 48.

A ribbed semiconductor laser 10 constructed in the aforementioned fashion produces single mode laser output in regions of the quantum well 40 beneath the ribs where contact is made with the power supply. For the exemplary semiconductor laser array 10 previously discussed, five micrometer wide ribs were produced which allowed a single mode index guided laser beam output to be produced in the areas beneath the ribs. Additionally, the semiconductor laser device 10 was approximately 600 micrometers long with the emitters spaced every 500 micrometers as measures from center to center. Additionally, the N and P-doping were accomplished by use of selenium for the N-doping and zinc for the P-doping, however, as is well known to those skilled in the art, numerous other materials may be utilized to correctly dope the semiconductor structure. Also, the exact number of layers and percentile of aluminum present may vary as is well known to those skilled in the art. Additionally, the width and spacing of the ribs as well as the physical dimension of the semiconductor laser array itself maybe varied quite widely as the particular application requires.

Following the deposition of a P-side contact layer 50 of GaAs an N-side contact 52 is deposited on the exposed surface of the substrate. The N-side contact 52 is typically comprised of gold or nickel.

While, as shown in FIG. 1, a power lead 14 may contact a standoff pad 16 from which plurality of metallic connectors join the standoff pad 16 to the semiconductor laser array 10, the power lead 16 could be directly applied to the P-side contact layer 50 in order to supply power to the semiconductor laser array 10. The plurality of metallic leads 18 used in FIG. 1 were utilized solely to provide more uniform power application to the P-side contact 50.

The semiconductor laser array 10, whose fabrication was previously described, must be mounted on the heatsink 12 in such a way that it remains flat or level across the laser array 10 so that the individual emitters 20 may be within the tolerance required, preferably, the bow of the laser array 10 is less than 0.8 micrometers, for proper collimation of the output. In order to ensure a flat mounting as well as efficient heat transfer from the semiconductor laser array 10 to the heatsink 12, a silver epoxy is utilized to both mount the semiconductor laser array and to provide heat transfer between the laser array 10 and the heat sink 12. The silver epoxy is applied by means of a standard screen printing process in which a thin layer of a thermally and electrically conductive silver epoxy is placed on a heatsink typically comprised of BeO or Cu-W. The layer of silver epoxy in the preferred embodiment is approximately 12 micrometers in thickness. The area of the heatsink 12 to which the silver epoxy was applied was defined by the opening in the screen such that a consistent thin layer of the silver epoxy could be applied in a sharply defined area. Following the deposition of a thin layer of silver epoxy, the GaAS semiconductor laser array 10 was positioned on the epoxy layer in such fashion that it was properly aligned with the front edge of the heatsink 12. This proper alignment maybe accomplished by insuring that the emitting facet of the semiconductor laser array 10 is parallel with the front edge of the heatsink 12. Following the positioning of the semiconductor laser array 10, the epoxy layer is cured so as to provide a high quality bond that provides enhanced structural integrity, excellent heatsinking properties with an estimated temperature loss across the bond of approximately 2° C., and a uniformity of temperature across the device to less than 15° C. The silver epoxy bond also allows for exact positioning with tolerances in die placement of less than 10 micrometers regularly achieved as well as for exact die flatness after curing of less than 1 micrometer total height change across a semiconductor laser device having a total width of 750 millimeters. Preferably, the laser array 10 is mounted p-side up to avoid the additional protective steps required to prevent epoxy from adhering to the front facet should the laser array 10 be mounted n-side up.

Once a semiconductor laser array 10 has been properly fabricated, mounted and powered, the output of a semiconductor laser array's emitters 20 must be properly collimated in order to obtain a proper output and a completely filled semiconductor laser array's aperture for optimum energy density. The lens assembly, as shown in FIG. 1, designed to collimate the output of the semiconductor laser array 10 is comprised of a first refractive lens 22, typically of a bioconvex design, and a second binary optical element 24 which is essentially a diffractive lens. The refractive biconvex lens 22 collimates the fast axis of an emitter 20 of the semiconductor laser array's output while the binary optical element 24 serves to collimate the slow axis of each emitter 20 and correct all spherical aberrations including those introduced by the collimation performed by the refractive lens 22.

The binary optical element 24 is comprised of a substrate on which a binary optical diffraction pattern 26 is etched. Generally, the materials of the refractive lens 22 and the binary optical element 24 should be selected to have substantially equivalent refractive indices such that minimal refraction occurs at the interface between the refractive lens 22 and the binary optical element 24. The binary optical element 24 has a back surface 27 positioned adjacent to the front surface 28 of the refractive lens 24 and a front surface 28 on which the binary optic diffraction pattern 26 is etched.

The binary optical diffraction pattern 26 is produced in accordance with typical binary optic technology as well known to those skilled in the art. Details of such binary optic etching processes and the determination of a binary optic element diffraction pattern may be found in an article in *Laser Focus World*, Aug. 29, 1989, page 47. Also, further reference may be found in U.S. Pat. No. 4,846,552, issued to Veldkamp entitled, method of fabricating high efficiency binary planar optical elements, et al which described generation of a planar aspheric lens using binary optics technology. This patent by Veldkamp, et al is herein incorporated by reference.

The binary optic diffraction pattern 26 is typically an eight phase level structure, although two, four, or sixteen-phase level structure could also be utilized, which corrects for optical path differences inherent in the divergent output light of an emitter of a semiconductor laser array. Thus, the rays of light which exit the binary optic element 24 will have all travelled equal optical pathlengths, defined as a physical pathlength multiplied by the index of refraction of the material through which the light ray travelled which are equal or varied from that equal optical pathlength by only an integer multiple of the wavelength of the light being emitted. An eight level binary optic diffractive pattern 26 is shown schematically in FIG. 1.

In accordance with binary optics technology, the optical transformation affected by an eight-level binary optical diffraction pattern 26 is encoded in a set of three lithographic masks. The optical path difference diverging rays of light upon their entry in the back surface 27 of the binary optic element 24 at various heights above the optical axis of the emitter 20 of the semiconductor laser array 10 are calculated and analyzed by conventional ray tracing computer programs which produce a wavefront phase map which in turn creates a mask as is well known to those skilled in the art. The generation of an eight level etched binary optical diffraction pattern 26 as shown in FIG. 1 utilizes sequential exposure to a first, second and third photolithographic mask with the first mask producing a two phase level structure and second mask producing a four phase level structure and the third mask producing an eight phase level structure. Light output from an emitter 20 of the semiconductor laser array 10 after its emergence from the front surface 29 of the binary optic element 24 has been collimate and aberration corrected such that the output light is of substantially equal intensity across the wavefront as well as being in-phase. While the output from such a lens assembly is still Gaussian, a distribution having a constant intensity across the wavefront would also be permissable should optical assembly producing such an output be substituted for the lens assembly herein described.

The refractive lens 22 and the binary optical element 27 must be aligned with the optical axis of semiconductor laser array's emitters 20 for best performance. This alignment is typically accomplished by initially cementing the binary optical element 24 to the refractive lens 22 using ultraviolet curing cement. While ultraviolet curing cement is used in a preferred embodiment, other types of similar adhesives as well as soldering, as well known to those skilled in the art, may be utilized. Additionally, while a binary optical element 24 is designed for each emitter 20 of the semiconductor laser array 10, the plurality of binary optical elements may be formed as a one-dimensional array binary optical elements. Also, a refractive rod lens 22, as shown in FIG. 1, may be utilized such that a single rod 22 may collimate the fast axis of each emitter 20 of the one-dimensional semiconductor laser array 10 in order to provide a more economical collimating assembly. Once the refractive lens 22 and the binary optical element 24 have been attached to one another, they are aligned with the emitters 20 of the semiconductors laser arrays 10 such that the optical axis of each emitter 20 is substantially centered within the lens assembly.

Figure 3:
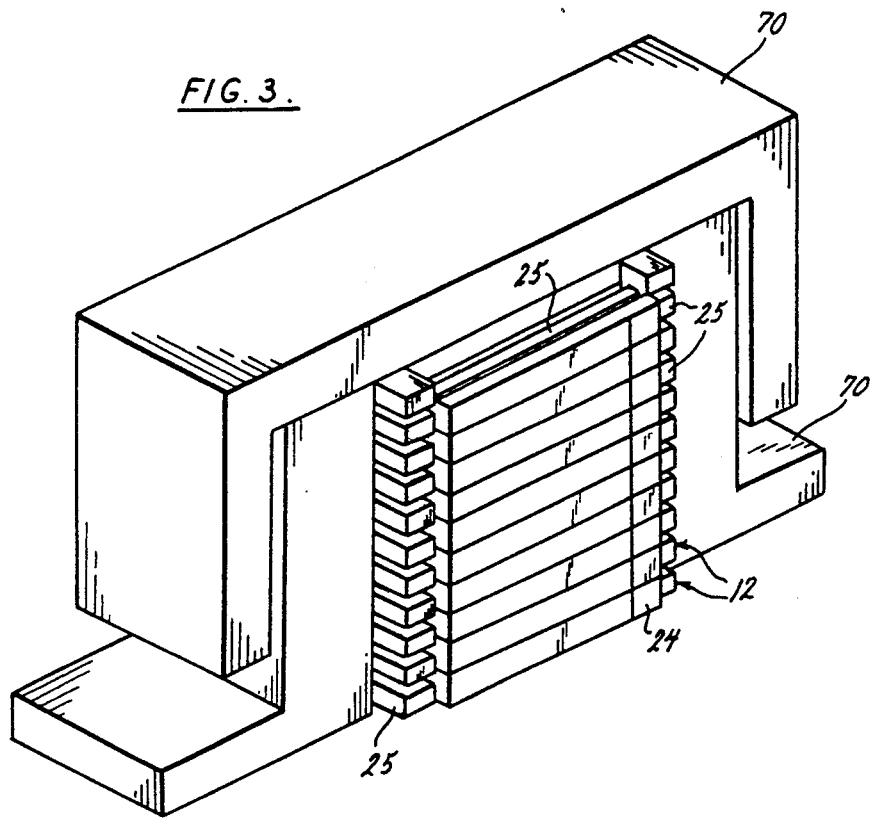
FIG. 3 is a two-dimensional semiconductor laser array and its associated collimating optics held within a clamping fixture.

A two-dimensional semiconductor laser array may be fabricated from a plurality of one-dimensional semiconductor laser arrays 10 as discussed previously and shown in FIG. 1. The one-dimensional semiconductor laser arrays 10 are stacked as shown in FIG. 3 within a heatsink which serves as a holding or clamping fixture 70. The clamping fixture 70 is designed such that the one-dimensional semiconductor laser arrays 10 may be stacked on top of one another so that the output of each one-dimensional semiconductor laser array are substantially parallel to the outputs of the other semiconductor laser arrays. Additionally, the clamping fixture 70 is designed such that while the one-dimensional semiconductor laser arrays 10 are arranged in parallel there is a slight space between each one-dimensional semiconductor laser array 10 to allow for a power lead 14 to be attached to the P-side contact 50 of the semiconductor laser array 10 and a ground lead to the N-side contact 52 of each semiconductor laser array 10. To ensure that adjacent one-dimensional laser arrays 10 do not establish electrically contact a layer of alumina may be placed between the heatsinks 12 of the one-dimensiinal laser arrays 10. To ensure optimum collimation, it was found that each of the one-dimensional semiconductor laser arrays 10 should be placed within the clamping fixture 70 prior to the alignment of any of the collimating lenses. The clamping fixture 70 also has provisions for heat transfer from each of the one-dimensional semiconductor laser arrays 10 to itself which serves as a heatsink. Thus the clamping fixture 70 may be comprised of any substance that provides sufficient heatsinking properties.

Figure 4:
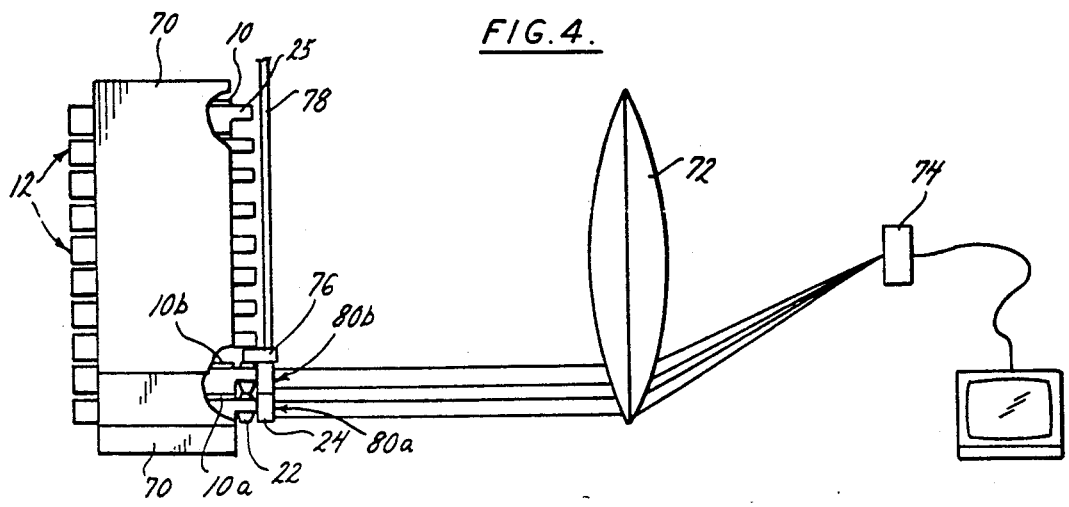
FIG. 4 is a side view of a transform lens in a two-dimensional semiconductor laser array structure illustrating the proper collimation of collimating lens assembly.

Once the one-dimensional semiconductor laser arrays 10 have been mounted within the clamping fixture 70, the collimating lenses should be fabricated and aligned. The fabrication of the collimating lenses is done in a manner identical to that previously discussed such that the refractive lens 22 is cemented to the binary optical element 24 which has been designed to collimate the laser output of each emitter 20. The alignment and attachment of the collimating lenses is accomplished in a sequential fashion for optimum efficiency. The collimating lenses 80a designed for the first one-dimensional semiconductor laser array 10a are positioned as previously described such that the optical axes of each emitter 20 of the semiconductor laser array 10 travels through substantially the center of the collimating lens assembly 80a. The second collimating lens assembly 80b is then placed in front of a second one-dimensional semiconductor laser array 10b and is held in position by means of a vacuum chuck 76 connected by a vacuum line to a vacuum source as shown in FIG. 4. The two-dimensional semiconductor laser array 10 is then supplied power such that the emitters 20 produce a light output. A transform lens 72 is positioned within the path of the light emitted from the first and second one-dimensional semiconductor laser arrays. The transform lens 72 may be a plano-convex or a biconvex, as shown in FIG. 4, lens design such that a simulated far field will appear at the focal plane of the transform lens 72 when the input light to the transform lens 72 is collimated. To determine the simulated far field as indicated, when all beams of light overlap at the focal plane of the transform lens 72, a line scan detector 74 is positioned at the focal plane which when monitored indicates if proper collimation has been achieved. Thus, the position of the second collimating lens assembly 80b is varied until proper collimation is observed at the focal point of the transform lens. Once proper collimation is observed, the position of the second collimating lens assembly 80b is preserved by holding the lens assembly in position in the ears 28 of the clamping fixture 70. An identical alignment procedure is done for each lens assembly and its corresponding one-dimensional semiconductor laser array 10. Once the lens assembly for each semiconductor laser array 10 has been properly aligned such that the light is collimated and focused at the simulated far field. The two-dimensional laser array when properly supplied with power produces a single collimated spot of laser output in the far field. By utilizing a plurality of one-dimensional semiconductor laser arrays 10 whose outputs may be combined, the output power of the two-dimensional semiconductor laser array may be quite high. For example, 5.7 watts of continuous wave laser energy was produced by a two-dimensional semiconductor laser array consisting of nine one-dimensional semiconductor laser arrays with each one-dimensional semiconductor laser array having ten emitters. Additionally, the overall efficiency of the laser array from electrical input to power in the central lobe was approximately 26%.

While the semiconductor laser array discussed heretofore has been limited to a one-dimensional semiconductor laser array 10 having plurality of emitters 20 spaced upon a single substrate 30. The diffraction limited laser array may be expanded to a two-dimensional semiconductor laser array comprised of a plurality of substantially identical one-dimensional laser arrays 10 as those discussed previously with the output of each one-dimensional laser array collimated and focused to a single spot to provide a high power output.

Figure 5:
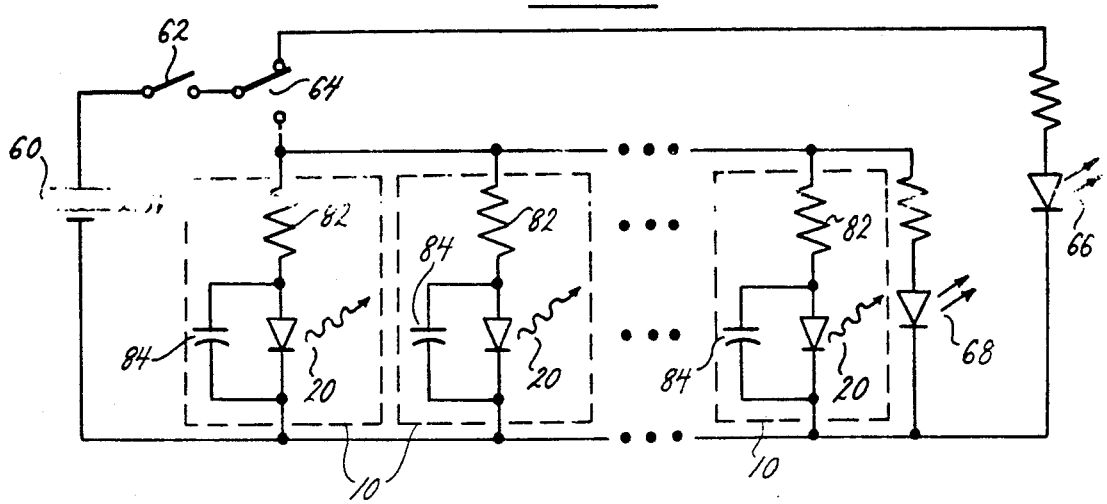
FIG. 5 is an electrical schematic illustrating electrical connections within a two-dimensional semiconductor laser array.

The semiconductor laser array 10 and collimating lens assembly, either individually or in combination as a two-dimensional laser array, as previously described may now be powered so as to provide a collimated beam of laser light. The power supply 60 utilized and the electrical circuit representing the two-dimensional semiconductor laser array is shown in FIG. 5. The semiconductor laser array 10 described heretofore may operate from a 2.5 volt power supply 60, typically supplied by nickel cadmium batteries. The two-dimensional semiconductor laser array with each one-dimensional array of emitters 20 represented by a photodiode in the circuit diagram in FIG. 5 requires a pair of switches to be positioned correctly. A safety key switch 62 is provided to arm and disarm semiconductor laser array 10. With the safety key switch 62 closed such that the laser array 10 is armed, the semiconductor laser 10 will not be powered if the second switch 64 is in the NC position and will be powered if the second switch 64 is in the NO position. A "Laser Armed" light emitting diode (LED) indicator 66 will provide a light output to indicate that the laser 10 is armed when the safety key switch 62 is closed and the second switch 64 is in the NC position. A "Laser On" LED indicator 68 will provide a light output to indicate the laser 10 is activated when the safety key switch 62 is closed and the second switch 64 is in the NO position. The "Laser On" LED indicator 68 is generally connected in parallel with the one-dimensional array of emitters 20. Current limiting resistors 82 are provided to protect each array of laser emitters 20. Additionally, the inherent capacitance 89 of the one-dimensional semiconductor laser array's emitters 20 is indicated in parallel with the photodiode 20 in FIG. 5. The 2.5 volt nickel cadmium battery 60 required for operation of the two-dimensional semiconductor laser array provides a very efficient and mobile source of power such that the semiconductor laser array may be readily transported and operated in many conditions in which a large or bulky power supply could be unavailable.

As shown in FIG. 5, each individual one-dimensional semiconductor laser array 10 of a two-dimensional semiconductor laser array is powered in an identical manner with each emitter of the one-dimensional semiconductor laser array 10 powered in parallel so as to decrease the size of the power supply required. In order to further limit the size of the power supply required to power the two-dimensional semiconductor laser array, each of the plurality of one-dimensional semiconductor laser arrays 10 comprising the two-dimensional semiconductor laser array is supplied power in parallel with each of the other one-dimensional semiconductor laser arrays 10 as illustrated in FIG. 3. The electrical configuration of FIG. 3 is applicable for any number of one-dimensional laser arrays 10 with switching system and LED indicators remaining identical to those illustrated.

Figure 6:
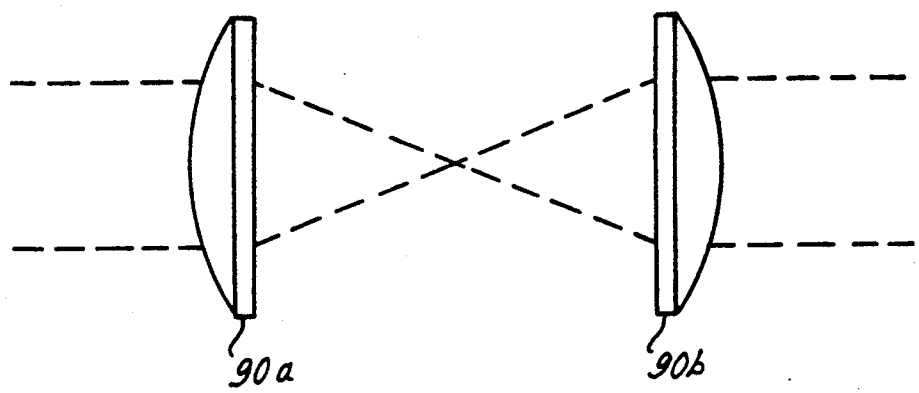
FIG. 6 is a side view of a pair of plano convex lenses utilized to provide variable focusing for a laser array.

Once the output of either a one-dimensional or two-dimensional semiconductor laser array has been collimated by the lens assembly the output may be focused to a single spot having a high power density by placing a lens such as a planar convex lens in the path of the beam. The single spot will be formed at a focal point of the lens. Should it be desirable, however, to have a focal length for the arrays output to be variable a pair of identical lenses may be utilized. For example, two identical plano convex lenses 90 may be positioned at a distance of two focal distances apart from one another as shown in FIG. 6. Thus, by adjusting either of the lenses while keeping the other lens is a fixed position, the resulting focal point external to the lens assembly is varied. The amount of the adjustment required by the lens is given by the formula:

$$x = f^2/(d-f)$$

wherein d is the total focal length of the system, f is the focal length of each plano convex lens 90 and x is the change in distance between the pair of lenses required to set the focal length of the system to an amount d. In order to shorten the focal length of the system a pair of lenses should be moved toward one another, while to lengthen the focal length of the system the lenses should be moved away from one another. In this fashion a single spot may be formed a variable distance from the emitting facet of the laser array simple by adjusting the spacing of the pair of lenses 90.

Figure 7:
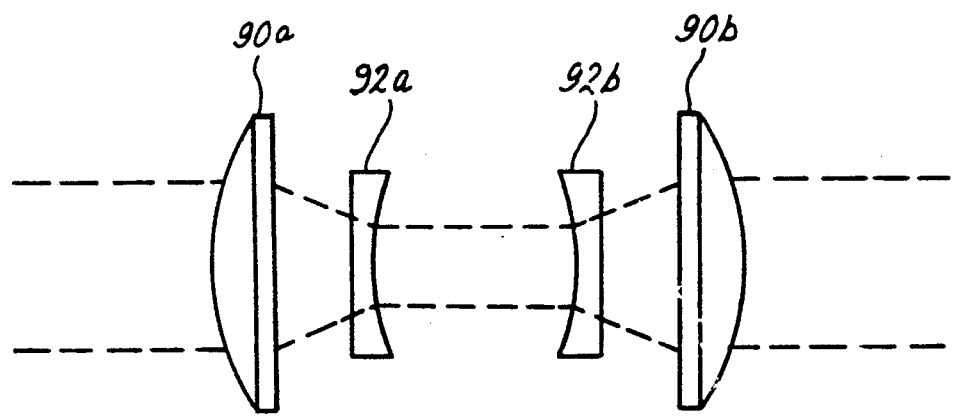
FIG. 7 is a side view of a lens assembly for providing variable focusing for a laser array without focusing the light to a single spot within the lens assembly.

For semiconductor laser arrays having sufficiently high power, a pair of fixed lenses 92, as shown in FIG. 7, may be introduced between the pair of plano convex lenses 90 in order to avoid focusing the light to a point between the plano convex lenses 90 pair since the intensity of the light at that point would be too great. The fixed lenses 92 is introduced between the plano convex lenses 90 are designed to transform the converging light rays from the first plano convex lens 90 to planar lightwaves by a first fixed lens 92a which are subsequently transformed to diverging light rays by a second fixed lens 92b. In this fashion an adjustable focal point for the semiconductor laser array may be achieved without requiring the light to be focused at a point between the pair of plano convex lenses 90 in situations in which a focusing of the light would introduce a spot of excessive power density.

Although there has been illustrated and described in specific detail and structure of operations it is clearly understood that the same were for purposes of illustration and that changes and modifications may be made readily therein by those skilled in the art without departing of the spirit and the scope of this invention.

I claim:

1. A one-dimensional semiconductor laser array assembly, comprising:
   a) a one-dimensional semiconductor laser array having a plurality of emitters wherein each emitter is electrically connected to a power supply means;
   b) a heatsink means for absorbing heat from the semiconductor laser array;
   c) a bonding means for attaching the semiconductor laser array to the heatsink means and transferring heat from the semiconductor laser array to the heatsink means, the bonding means having a uniform thickness;
   d) a refractive lens means for collimating a fast axis of the output of each emitter of the semiconductor laser array; and
   e) a one-dimensional array of binary optical elements for collimating a slow axis of the output of the emitters of the semiconductor laser array and correcting aberrations therein, wherein each individual binary optical element corresponds to a distinct individual emitter of the semiconductor laser array, each binary optical element comprising a substantially planar substrate having a front surface wherein the front surface has been formed such that the optical path length travelled by each ray of divergent light emitted by an emitter of the semiconductor laser array is equal upon the ray's exit from the front surface of the binary optical element.

2. A one-dimensional semiconductor laser array assembly, as recited in claim 1, wherein the front surface of each binary optical element has a binary optic diffractive element etched thereon.

3. A one-dimensional semiconductor laser array assembly, as recited in claim 2, wherein the bonding means is comprised of silver epoxy.

4. A one-dimensional semiconductor laser array assembly, as recited in claim 3, wherein the refractive lens means is a biconvex rod lens.

5. A one-dimensional semiconductor laser array assembly, as recited in claim 3, wherein the heatsink means is comprised of a material selected from the group consisting of beryllium oxide (BeO) and Elkonite (Cu-W).

6. A one-dimensional semiconductor laser array assembly, as recited in claim 3, wherein the binary optic diffractive element is a structure selected from the group consisting of a two-phase level structure, a four-phase level structure, an eight-phase level structure, and a sixteen-phase level structure.

7. A one-dimensional semiconductor laser array assembly, as recited in claim 3, wherein the heatsink means comprises a holding means for fixedly retaining the refractive lens means and the binary optic diffractive element.

8. A one-dimensional semiconductor laser array, as recited in claim 3, further comprising at least one lens positioned to focus the collimated output of the emitters.

9. A one-dimensional semiconductor laser array, as recited in claim 8, wherein two plano convex lenses of equal focal length are adjustly positioned to focus the collimated output of the emitters at a variable position.

10. A one-dimensional semiconductor laser array, as recited in claim 9, wherein two fixed lenses are positioned between the two plano convex lenses to prevent the collimated output of the emitter from being focused to a spot between the two plano convex lenses.

11. A two-dimensional semiconductor laser array assembly, comprising:
   a) a plurality of one-dimensional semiconductor laser array assemblies wherein each one-dimensional semiconductor laser array assembly comprises:
      1) a one-dimensional semiconductor laser array having a plurality of emitters wherein each emitter is electrically connected to a power supply means;
      2) a heatsink means for absorbing heat from the semiconductor laser array;
      3) a bonding means for attaching the semiconductor laser array to the heatsink means and transferring heat from the semiconductor laser array to the heatsink means, the bonding means having a uniform thickness;
      4) a refractive lens means for collimating a fast axis of the output of each emitter of the semiconductor laser array; and
      5) a one-dimensional array of binary optical elements for collimating a slow axis of the output of the emitters of the semiconductor laser array and correcting aberrations therein, wherein each individual binary optical element corresponds to a distinct individual emitter of the semiconductor laser array, each binary optical element comprising a substantially planar substrate having a front surface wherein the front surface has been formed such that the optical path length travelled by each ray of divergent light emitted by an emitter of the semiconductor laser array is equal upon the ray's exit from the front surface of the binary optical element; and
   b) a clamping fixture for fixedly retaining the plurality of one-dimensional semiconductor laser array assemblies such the plurality of one-dimensional semiconductor laser array assemblies are substantially parallel.

12. A two-dimensional semiconductor laser array assembly, as recited in claim 11, wherein the front surface of each binary optical element has a binary optic diffractive element etched thereon.

13. A two-dimensional semiconductor laser array assembly, as recited in claim 12, wherein each bonding means is comprised of silver epoxy.

14. A two-dimensional semiconductor laser array assembly, as recited in claim 13, wherein each refractive lens means is a biconvex rod lens.

15. A two-dimensional semiconductor laser array assembly, as recited in claim 13, wherein each heatsink means is comprised of a material selected from the group consisting of beryllium oxide (BeO) and Elkonite (Cu-W).

16. A two-dimensional semiconductor laser array assembly, as recited in claim 13, wherein each binary optic diffractive element is a structure selected from the group consisting of a two-phase level structure, a four-phase level structure, an eight-phase level structure, and a sixteen-phase level structure.

17. A two-dimensional semiconductor laser array assembly, as recited in claim 13, wherein each heatsink means comprises a holding means for fixedly retaining the refractive lens means and the binary optic diffractive element.

18. A two-dimensional semiconductor laser array, as recited in claim 13, further comprising at least one lens positioned to focus the collimated output of the emitters.

19. A two-dimensional semiconductor laser array, as recited in claim 18, wherein two plano convex lenses of equal focal length are adjustly positioned to focus the collimated output of the emitters at a variable position.

20. A two-dimensional semiconductor laser array, as recited in claim 19, wherein two fixed lenses are positioned between the two plano convex lenses to prevent the collimated output of the emitter from being focused to a spot between the two plano convex lenses.

21. A method for aligning the output of a two-dimensional semiconductor laser array assembly, comprising the steps of:
- a) placing a first one-dimensional semiconductor laser array assembly in a clamping fixture;
- b) placing a second one-dimensional semiconductor laser array assembly in the clamping fixture such the second one-dimensional semiconductor laser array assembly is substantially parallel to the first one-dimensional semiconductor laser array assembly;
- c) positioning a set of collimating optics for the second one-dimensional semiconductor laser array assembly such that the output of the second semiconductor laser array, placed within the clamping fixture, travels through substantially the center of the collimating optics;
- d) supplying power to each of the one-dimensional semiconductor laser array assemblies following the positioning of the collimating optics;
- e) introducing a transform lens in the optical path of the output of each one-dimensional semiconductor laser array assembly to simulate a far field of the two-dimensional semiconductor laser array assembly;
- f) monitoring the power level at the focal point of the transform lens;
- g) altering the position of the collimating optics until a maximum power level is detected by the monitor;
- h) retaining the collimating optics in the position corresponding to the highest power level detected; and
- i) repeating steps (b) through (h) for each additional one-dimensional semiconductor laser array assembly of the two-dimensional semiconductor laser array assembly.

* * * * *